(12) United States Patent
Browning

(10) Patent No.: US 11,279,482 B2
(45) Date of Patent: Mar. 22, 2022

(54) FLIGHT SYSTEM

(71) Applicant: Gravity Industries Ltd., Salisbury (GB)

(72) Inventor: Richard Browning, Salisbury (GB)

(73) Assignee: GRAVITY INDUSTRIES LTD., Salisbury (GB)

( * ) Notice: Subject to any disclaimer, the term of this patent is extended or adjusted under 35 U.S.C. 154(b) by 134 days.

(21) Appl. No.: 16/488,111

(22) PCT Filed: Feb. 21, 2018

(86) PCT No.: PCT/GB2018/050449
§ 371 (c)(1),
(2) Date: Aug. 22, 2019

(87) PCT Pub. No.: WO2018/154293
PCT Pub. Date: Aug. 30, 2018

(65) Prior Publication Data
US 2019/0382114 A1    Dec. 19, 2019

(30) Foreign Application Priority Data

Feb. 22, 2017  (GB) ..................................... 1702852

(51) Int. Cl.
*B64C 39/02* (2006.01)
*B64D 27/02* (2006.01)
(Continued)

(52) U.S. Cl.
CPC ............ *B64C 39/026* (2013.01); *B64D 27/02* (2013.01); *B64D 31/04* (2013.01); *B64D 37/06* (2013.01);
(Continued)

(58) Field of Classification Search
CPC ......... B64C 39/026; B63B 34/15; B64G 4/00; B64G 6/00
See application file for complete search history.

(56) References Cited

U.S. PATENT DOCUMENTS 3,023,980 A * 3/1962 Martin .................. B64C 39/026
244/4 A
3,107,069 A * 10/1963 Draim ...................... B64G 4/00
244/4 A
(Continued)

FOREIGN PATENT DOCUMENTS

AU    2007100576 A4    8/2007
CN       102556348       7/2012
(Continued)

OTHER PUBLICATIONS

"Iron Man" (2008), Sci-fi/Thriller, 2h 6m; Release date May 2, 2008 (USA); Director: Jon Favreau. https://en.wikipedia.org/wiki/Iron_Man_(2008_film).
(Continued)

*Primary Examiner* — Richard R. Green
*Assistant Examiner* — William L Gmoser
(74) *Attorney, Agent, or Firm* — Jason P. Mueller; FisherBroyles, LLP

(57) ABSTRACT

A disclosed device allows a person to fly. A disclosed wearable flight system includes a plurality of propulsion assemblies including a left-hand propulsion assembly configured to be worn on a user's left hand and/or forearm and a right-hand propulsion assembly configured to be worn on a user's right hand and/or forearm. A further embodiment includes a body propulsion device that is configured to provide a net force along an axis defining a net body propulsion vector and a support device configured to support a user's waist or torso. The support device is configured to hold a user's body relative to the body propulsion device
(Continued)

such that a line extending between center the of the user's head and the center of the user's waist extends, relative to the orientation of the net body propulsion vector during use, by a body propulsion elevation angle that is greater than zero.

15 Claims, 12 Drawing Sheets

(51) Int. Cl.
    *B64D 31/04*     (2006.01)
    *B64D 37/06*     (2006.01)
    *B64D 45/00*     (2006.01)
    *F02C 6/00*     (2006.01)

(52) U.S. Cl.
    CPC ............... *B64D 45/00* (2013.01); *F02C 6/00* (2013.01); *B64D 2045/0085* (2013.01)

(56) References Cited

U.S. PATENT DOCUMENTS

| | | | | |
|---|---|---|---|---|
| 3,662,973 | A * | 5/1972 | Paine | B64C 39/026 244/23 A |
| 4,040,577 | A | 8/1977 | Moore | |
| 4,253,625 | A | 3/1981 | Dmitrowsky | |
| 8,851,943 | B2 | 10/2014 | Zapata | |
| 10,364,028 | B1 * | 7/2019 | Wilhour | B64C 27/00 |
| 2008/0142644 | A1 | 6/2008 | O'Roark | |
| 2009/0020654 | A1 * | 1/2009 | Tyler | B64C 39/026 244/23 A |
| 2014/0196650 | A1 | 7/2014 | Zapata | |
| 2014/0374542 | A1 * | 12/2014 | Li | B63H 11/04 244/4 A |
| 2015/0158567 | A1 * | 6/2015 | Zapata | B63H 5/00 440/38 |
| 2015/0210389 | A1 | 7/2015 | Murdock | |
| 2017/0015419 | A1 * | 1/2017 | Tyler | B64C 39/026 |
| 2018/0320568 | A1 * | 11/2018 | Aronsson | F01M 1/02 |

FOREIGN PATENT DOCUMENTS

| | | |
|---|---|---|
| CN | 106545481 A | 3/2017 |
| JP | 2006297554 A | 11/2006 |
| WO | 2016/097375 A1 | 6/2016 |

OTHER PUBLICATIONS

Wearable flight system. http://web.archive.org/web/20180309173735/ http://www.urbanape.com/gravity.html, archived Mar. 9, 2018, [accessed Dec. 12, 2019].

YouTube video clip entitled "Flying Like Iron Man #1: The Concept," uploaded on Jun. 6, 2016 by user "Hacksmith Industries". Retrieved from the Internet: <https://youtu.be/U7ULGRWny4E>.

YouTube video clip entitled "Flying Like Iron Man #2: First Rocket Tests," uploaded on Jun. 13, 2016 by user "Hacksmith Industries". Retrieved from the Internet: <https://youtu.be/y4AEXPo_3zs>.

YouTube video clip entitled "Flying Like Iron Man #3: Tony's Test Flight," uploaded on Jun. 20, 2016 by user "Hacksmith Industries". Retrieved from the Internet: <https://youtu.be/zDIVcx_EoTM>.

YouTube video clip entitled "Flying Like Iron Man #4: Rocket Crutches," uploaded on Jun. 27, 2016 by user "Hacksmith Industries". Retrieved from the Internet: <https://youtu.be/3tlkgCYB-5U>.

YouTube video clip entitled "Flying Like Iron Man #5: Heat Shields?," uploaded on Jul. 4, 2016 by user "Hacksmith Industries". Retrieved from the Internet: <https://youtu.be/C45klvOI8Oc>.

YouTube video clip entitled "Flying Like Iron Man #6: The Final Preparations," uploaded on Jul. 11, 2016 by user "Hacksmith Industries". Retrieved from the Internet: <https://youtu.be/xdmp8sY96Xs>.

YouTube video clip entitled "Flying Like Iron Man #7: First test with rockets!," uploaded on Jul. 16, 2016 by user "Hacksmith Industries". Retrieved from the Internet: <https://youtu.be/84PXRp82vS4>.

YouTube video clip entitled "Flying Like Iron Man #8: The Plan with Electric Ducted Fans," uploaded on Aug. 29, 2016 by user "Hacksmith Industries". Retrieved from the Internet: <https://youtu.be/2j_qdFrBVtk>.

YouTube video clip entitled "Flying Like Iron Man #9: First Assisted Hover!," uploaded on Sep. 28, 2016 by user "Hacksmith Industries". Retrieved from the Internet: <https://youtu.be/v4XB18RzTho>.

YouTube video clip entitled "Flying Like Iron Man #10: Jet Boots," uploaded on Nov. 7, 2016 by user "Hacksmith Industries". Retrieved from the Internet: <https://youtu.be/ObSgffWoD9Y>.

YouTube video clip entitled "Flying Like Iron Man #11: Not So Safe Safety Tests," uploaded on Nov. 25, 2016 by user "Hacksmith Industries". Retrieved from the Internet: <https://youtu.be/JdV4gS0c26A>.

\* cited by examiner

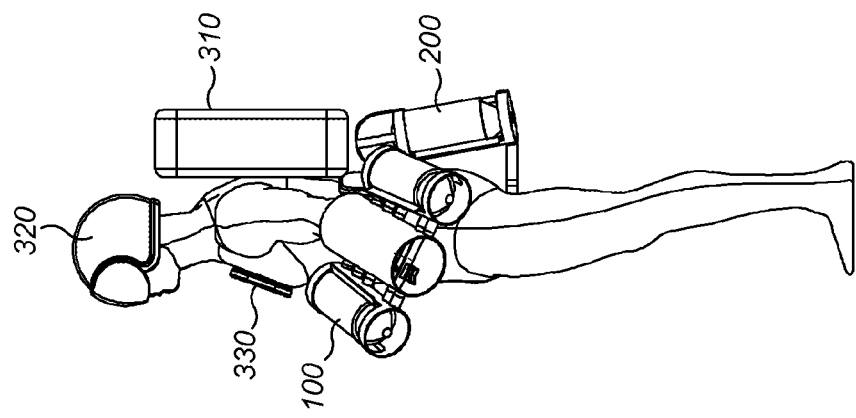
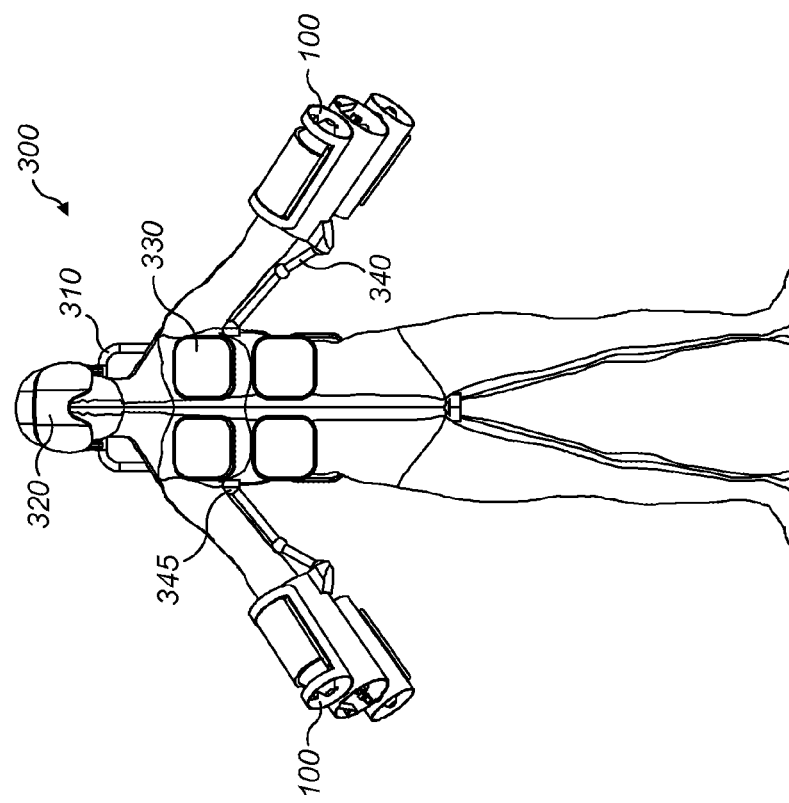
FIG. 3b
FIG. 3a

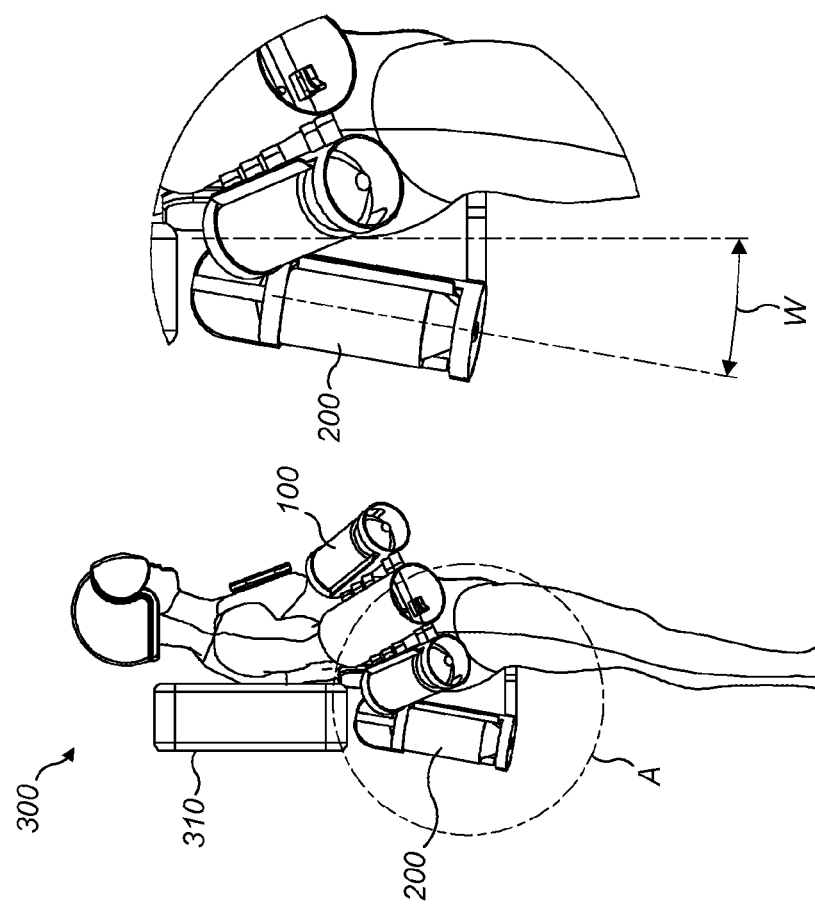
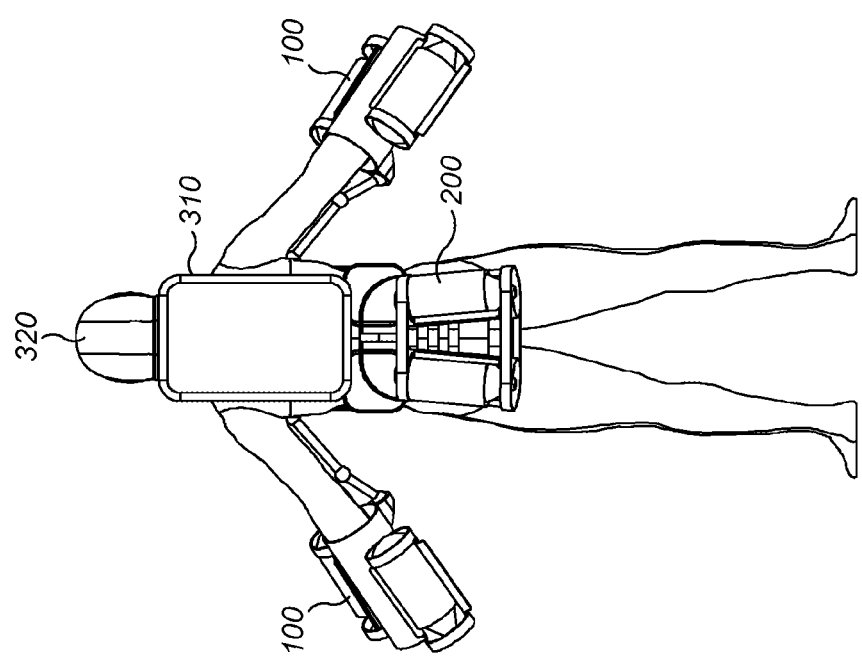
FIG. 3d
FIG. 3c

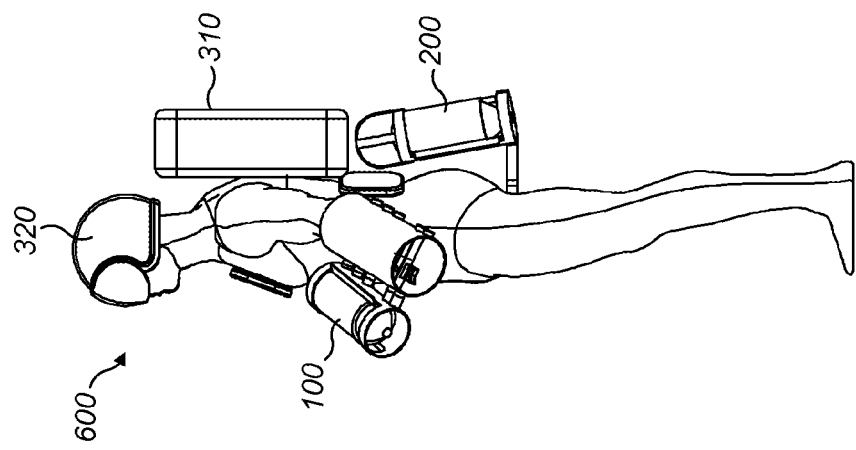
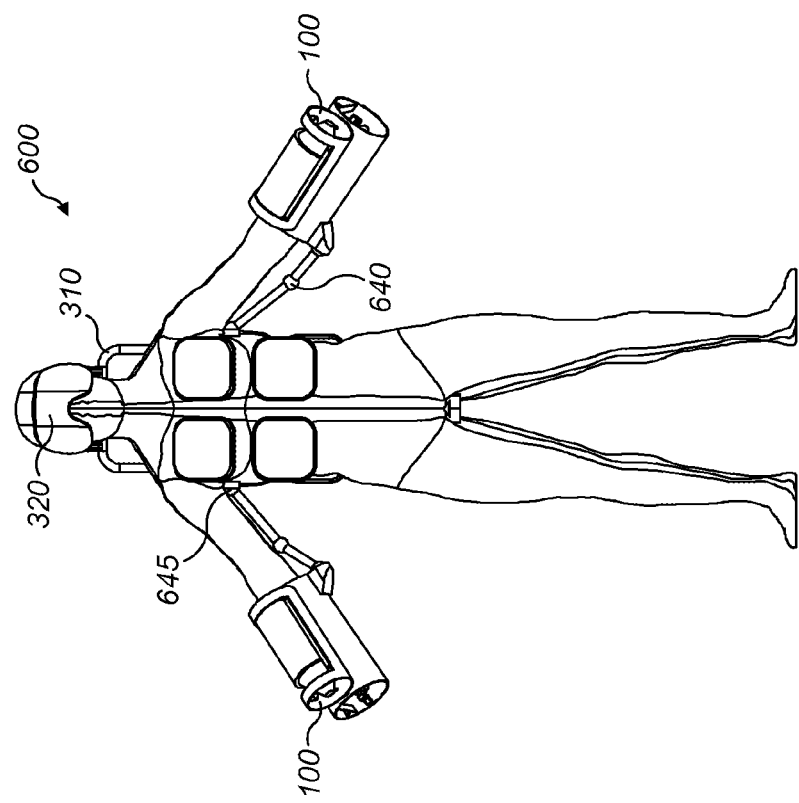

FLIGHT SYSTEM

CROSS-REFERENCE TO RELATED APPLICATIONS

This application is a national stage entry under 35 U.S.C. of 371 of PCT Patent Application No. PCT/GB2018/050449, filed Feb. 21, 2018, which claims priority to United Kingdom Patent Application No. 1702852.3, filed Feb. 22, 2017, the entire contents of each of which are incorporated herein by reference.

STATEMENT REGARDING FEDERALLY SPONSORED RESEARCH OR DEVELOPMENT

N/A

THE NAMES OF THE PARTIES TO A JOINT RESEARCH AGREEMENT

N/A

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

N/A

BACKGROUND

This disclosure relates to an apparatus that allows an individual to fly. For example, the disclosure relates to the provision of propulsion assemblies that can be held in a user's hands and/or worn on a user's forearms and provide thrust to lift the user from the ground.

There have been many attempts in the past to allow individuals to fly with only minimal equipment. Typically, such systems are formed of a framework that rigidly connects one or more propulsion devices with each other or with a wing.

BRIEF SUMMARY OF THE DISCLOSURE

The inventors have realized that it is possible to configure a flight system that can use the strength of the human body, rather than a rigid frame work, to provide stable flight for an individual.

Accordingly, there is provided a wearable flight system and a propulsion assembly as defined by the claims.

By propulsion assembly is meant a device that produces thrust. A propulsion assembly may include one or more propulsion devices that each provide thrust (for example, in a known direction) and collectively define the thrust that is produced by the propulsion assembly. The thrust provided by a propulsion assembly produces an equal and opposite force on the user. Each propulsion assembly is able to provide a maximum thrust of at least 400N and in some embodiments at least 500N. Each propulsion assembly may be controllable to produce a lower thrust than the maximum based on control signals. The propulsion assemblies may include turbines or ducted fans.

By "wearable" is meant that propulsion assemblies of the flight system (those parts that provide thrust) may be mounted on the human body such that the "wearer" contributes at least in part to the relative motion of those propulsion assemblies. That is, it is recognized that the difficult control problem of correctly angling a variety of thrusts produced by a plurality of propulsion assemblies may be delegated to the wearer's natural senses of balance, proprioception, and kinesthesia.

Embodiments of the disclosure include a flight system comprising at least two propulsion assemblies that may be held in the hands and/or otherwise mounted on the wearer's forearms.

In such a system, net thrust is directed substantially in line with the user's respective forearm and away from the elbow so that the induced stress is generally aligned with the bones of the wearer's forearm and is directed outwardly. Here, reference is made to net thrust rather than all thrust. There may be multiple propulsion devices that individually produce thrust that is not aligned with the wearer's arm, but collectively for each propulsion device the net thrust (the resolution of the generated forces) will be so aligned.

A suitably physically conditioned wearer is able to support his/her own weight using just his/her arms, but for longer usage, it may be advantageous to share some of the load with other parts of the wearer's skeleton or musculature. Optionally, therefore, there may additionally be provided a body propulsion assembly arranged for engaging the wearer's torso to substantially prevent relative movement between the body propulsion assembly and the wearer's torso. In addition, or alternatively, one or more leg propulsion assemblies (either one for both legs or one for each leg) can be provided. The leg propulsion assemblies may be arranged for engaging one or both of the wearer's legs to substantially prevent relative movement between the leg propulsion assemblies and the wearer's corresponding leg(s).

In various embodiments, however, half or the majority of the load is carried by the left-hand and right-hand propulsion assemblies collectively. In other words, the maximum thrust capability of the left-hand and right-hand propulsion assemblies together may be equal to or greater than the maximum thrust capability of the other propulsion assemblies combined.

In fact, it has been found that providing a thrust roughly equal between each of: the left-hand propulsion assembly; the right-hand propulsion assembly; and, collectively, the other propulsion assemblies, provide even more stability (i.e., tripod-like balance between each arm and the body). Therefore, the maximum thrust capability of the left-hand and right-hand propulsion assemblies together may be equal and the maximum thrust capability of each of the left-hand and right-hand propulsion assemblies may be equal to or greater than the maximum thrust capability of the other propulsion assemblies combined.

Lift is produced by the combined vertical resolution of the forces generated by all of the propulsion assemblies. Whilst not essential, for reasons of control and stability the thrust generated by the left-hand and right-hand propulsion assemblies is equal. In order to control horizontal motion, the wearer can use his/her arms to direct the left-hand and right-hand propulsion assemblies to produce a net thrust that includes a horizontal component.

When a body propulsion assembly is provided, this may be inclined relative to the torso of the wearer (by virtue of the arrangement of a support through which it engages the wearer) so as to provide a small net forward force on the wearer, i.e. the thrust is directed rearwardly to produce a net force on the wearer in a forward direction perpendicular to a line extending between the center of the user's head and the center of the user's waist. In other words, with the wearer supported in an upright position, the body propulsion assembly may provide a net forward force. That forward force may be counteracted by the wearer inclining his/her arms in front of his/her torso to provide an equal net thrust in the opposite direction. Thus, the assemblies are arranged such that collectively they can produce equilibrium (a net vertical thrust equal to the load of the wearer and flight system, with a zero net horizontal thrust) when in a splayed (i.e. divergent) arrangement. Of course, this also has the advantage that the exhaust of the propulsion assemblies is directed away from the wearer's body.

When a body propulsion assembly is provided, it may be arranged vertically at the same height as the left-hand and right-hand propulsion assemblies when in the splayed arrangement that produces equilibrium. It has been found that a good location on the body of the wearer is therefore in the region of the wearer's waist (that is, the thrust is generated near the wearer's waist). The outlet of the thrust is no higher than the user's lumbar vertebrae and no lower than the user's thighs. The outlet of the thrust may be aligned with the user's lumbar vertebrae.

Among other advantages, in the case that turbines or fans are used to provide thrust, this ensures that the air take in by one propulsion assembly is not fed by the outlet of another propulsion assembly.

In optional embodiments, a fuel tank supplies fuel to the propulsion assemblies (for example, the fuel may supply turbines forming the propulsion devices). Since the user is flying based on feel, it is important that the experience remains constant over time so that the user does not need to greatly re-calibrate his or her actions as the fuel is used up. Accordingly, the thrust provided by one or more or all of the propulsion assemblies can be automatically varied as a function of the stored fuel. That is the fuel use (or the remaining stored fuel) may be monitored, and the thrust provided by the propulsion assemblies may be used to compensate for the reduction in weight of the fuel load. Fuel use/remaining fuel may be measured directly, or inferred either by the use of one or more propulsion devices.

Since the fuel store may be carried on the user's back, it is advantageous in that case that the thrust of a body propulsion assembly (since this will be located most closely to the fuel store) is varied as a function of the stored fuel. The thrust of the body propulsion assembly is automatically reduced to compensate for the reducing load of the fuel store as fuel is used.

In various embodiments, the propulsion assemblies configured to be worn on a user's hand or forearm may include at least two hand propulsion devices in a splayed arrangement that produce thrusts that diverge such that their net thrust is substantially aligned with the wearer's arm. This has been found to add to the stability of the overall system.

The flight system of the disclosure may be provided with or without one or more wings. However, the features set out below make it unnecessary to use a wing.

BRIEF DESCRIPTION OF THE SEVERAL VIEWS OF THE DRAWINGS

For a better understanding of the disclosure, and to show how the same may be put into effect, reference will now be made, by way of example only, to the accompanying drawings in which.

FIGS. 3a to 3e show a first embodiment of a flight system in accordance with the disclosure;

FIGS. 6a to 6d show a third embodiment of a flight system in accordance with the disclosure.

DETAILED DESCRIPTION OF THE DISCLOSURE

Figure 1A:
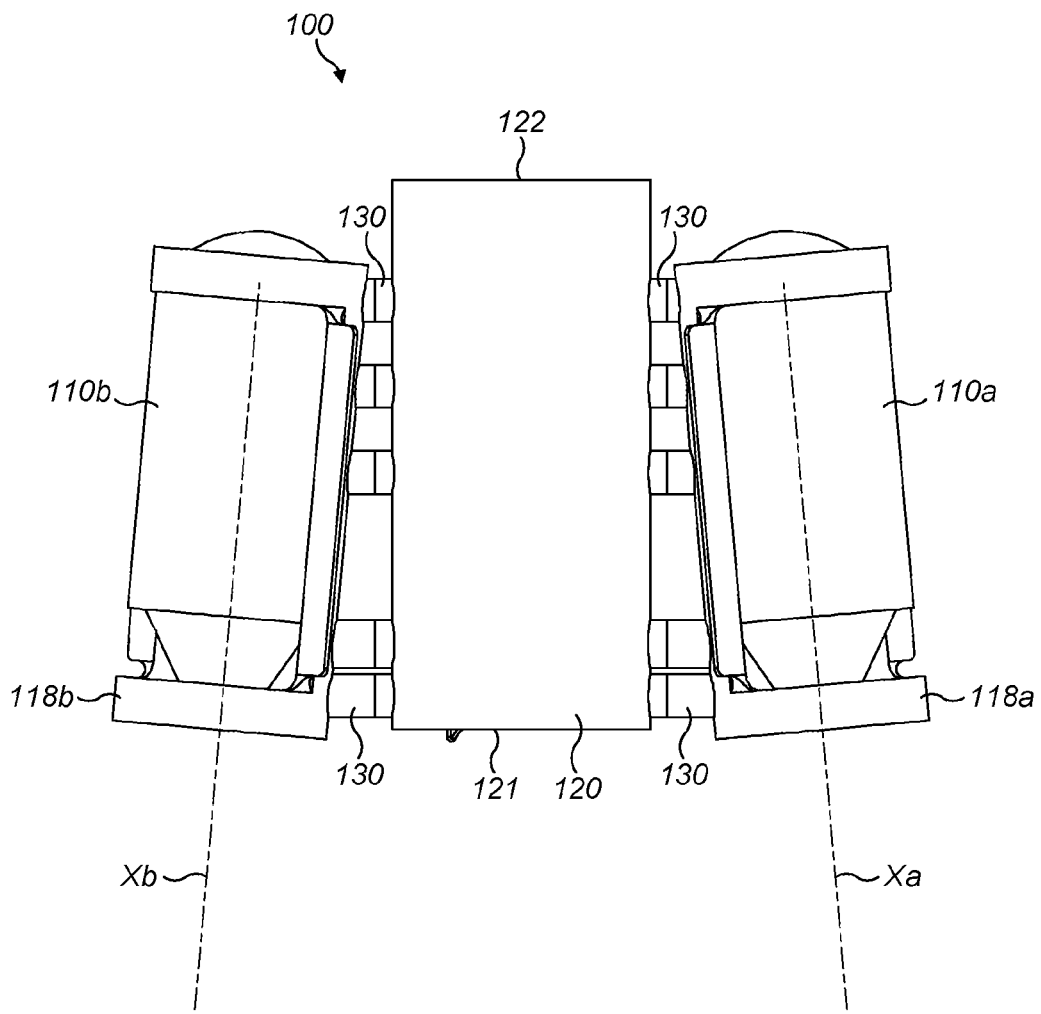
FIGS. 1a to 1c show a first propulsion assembly for use in an embodiment of the disclosure.
Figure 1B:
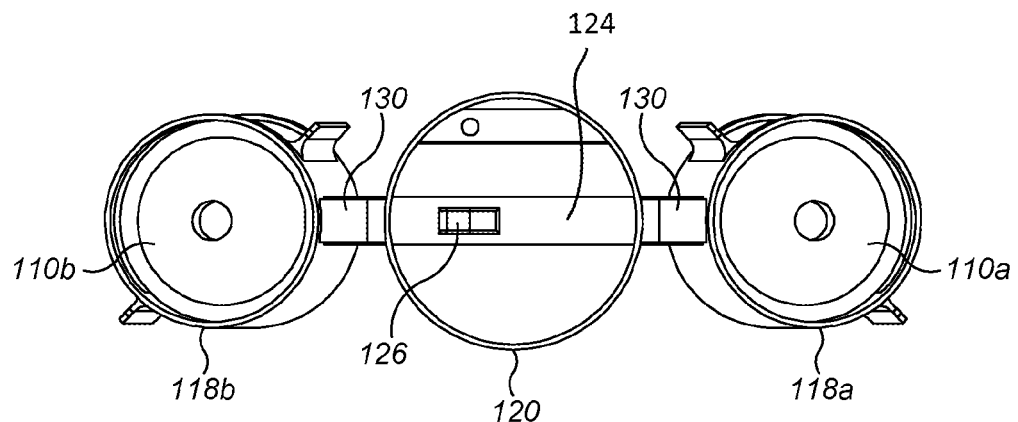
Figure 1C:
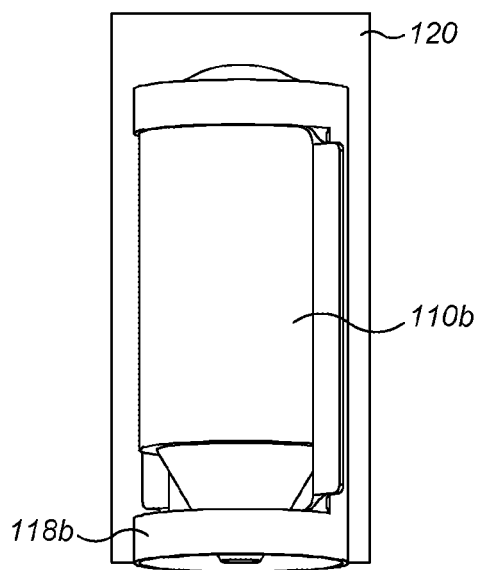

A first embodiment of a propulsion assembly 100 for applying thrust directly to a user's arm is shown in FIGS. 1a to 1c. Of course, it is intended that a flight system in accordance with the disclosure will have one propulsion assembly 100 for each arm.

With reference to FIG. 1a, a propulsion assembly 100 includes: one or more propulsion devices 110; a sleeve 120; and one or more mountings 118.

In the depicted embodiment there are two propulsion devices 110, a first propulsion device 110a, and a second propulsion device 110b. For the/each propulsion device 110a, 110b, there is a mounting 118a, 118b via which the respective propulsion device 110a, 110b may be mounted to the sleeve 120.

The sleeve 120 of the propulsion assembly 100 is configured to be worn on a user's hand and/or forearm. It is advantageous that the sleeve 120 extends over a length of from 20 cm to 50 cm, and in some embodiments a length of from 30 cm to 35 cm, so that the propulsion assembly 100 is held in alignment with the user's arm, but does not hinder articulation of the elbow. The sleeve 120 defines a longitudinal axis, a distal end 121 and a proximal end 122. When the propulsion assembly 100 is worn, the distal end 121 is distal with respect to the user's body (e.g. nearer the user's hand) and the proximal end 122 is proximal with respect to the user's body (e.g. nearer the user's elbow). The sleeve 120 may have a diameter in the range 8 cm to 10 cm.

The sleeve 120 is padded on the inside. The padding may be shaped to the general contour of an arm so as to distribute support comfortably.

Irrespective of the number of propulsion devices 110, the propulsion assembly 100 as a whole is arranged to provide a net thrust along an axis that generally corresponds with the user's forearm when the propulsion assembly 100 is worn. That is, the propulsion assembly 100 as a whole is arranged to provide a net thrust along the longitudinal axis of the sleeve 120.

The first and second propulsion devices 110a, 110b are angled apart so as to produce thrust along non-parallel vectors. For example, the mountings 118a and 118b may include connecting members 130 that space the propulsion devices 110a, 110b from the sleeve 120 by a greater amount at the distal end 121 than at the proximal end 122.

The first propulsion device 110a is arranged to provide net force along a first axis Xa defining a first propulsion vector. The second propulsion device 110b is arranged to provide net force along a second axis Xb defining a second propulsion vector.

It has been found that the divergence of thrust can provide beneficial stability. Therefore, the first propulsion vector is at least an angle of 5° relative to the second propulsion vector and in some embodiments at least an angle of 10°. Furthermore, it is advantageous that the first propulsion vector is no more than an angle of 30° relative to the second propulsion vector and in some embodiments no more than 25°. By remaining within this range, the loss of thrust due to divergence can be balanced against the improved stability.

As best shown in FIG. 1b, within the sleeve 120 there is provided a handle 124 for the user to grasp. The handle 124 may have mounted thereon controls 126. The controls 126 face the distal end 121 of the sleeve 120. In this way, when a portion of the user's weight is applied to the handle for support, the user's fingers will be free to manipulate the controls 126. The handle 124 is ergonomically-shaped so as to distribute the user's weight over as large an area of the user's hand as possible. As a result, a left-hand propulsion assembly 100 may have a left-handed grip 124, while a right-hand propulsion assembly 100 may have a right-handed grip 124. One or both of the left-hand grip 124 and right-hand grip 124 will have controls 126 mounted thereon.

As in this embodiment, when first and second propulsion devices 110a, 110b are provided, the handle may be positioned such that it is aligned with a line extending between the first and second propulsion devices 110a, 110b. This defines the position of the first and second propulsion devices 110a, 110b relative to the user's closed fist, and has been found to be particularly stable.

The inventors have realized that the position of the handle 124 relative to the outlet(s) of the propulsion device(s) 110 of the propulsion assembly 100 can influence stability. The handle 124 may be spaced beyond the outlet(s) of the propulsion assembly 100 (e.g. the outlets of the first and second propulsion devices 110a, 110b) by a distance in the range 20 mm to 100 mm, and in some embodiments by 30 mm to 60 mm, in some embodiments by 40 mm.

That is to say that the handle 124 may be spaced by this distance beyond the outlets in a direction corresponding to the axis of the net thrust Put another way, the handle 124 may be spaced by this distance beyond the outlets in a direction corresponding to the longitudinal axis of the sleeve 120 if provided.

The handle 124 may be spaced by this distance beyond the outlets in a direction corresponding to the axis that generally corresponds with the user's forearm when the propulsion assembly 100 is worn.

The controls 126 include two input devices. The first of the input devices provides a variable signal and can be used to control an amount of thrust produced by a propulsion assembly 100 (or a set of propulsion assemblies 100). The second of the input devices provides a binary output and can be used to deactivate one or more or all of the propulsion assemblies 100 of the flight system when released. It is not essential that both left-hand and right-hand propulsion assemblies 100 include the second input device. The second of the input devices may be a "kill switch". That is, it must remain depressed by the user in order to prevent deactivation of the propulsion assemblies 100.

The controls 126 are mounted on the handle so as to align with the thumb and forefinger of the user. The first input device is therefore in the form of a trigger aligned with the user's index finger (when the handle is held in the user's hand). The second input device may be aligned with the user's thumb (when the handle is held in the user's hand) so that it can be continually held down during use of the flight system to prevent deactivation.

Figure 2A:
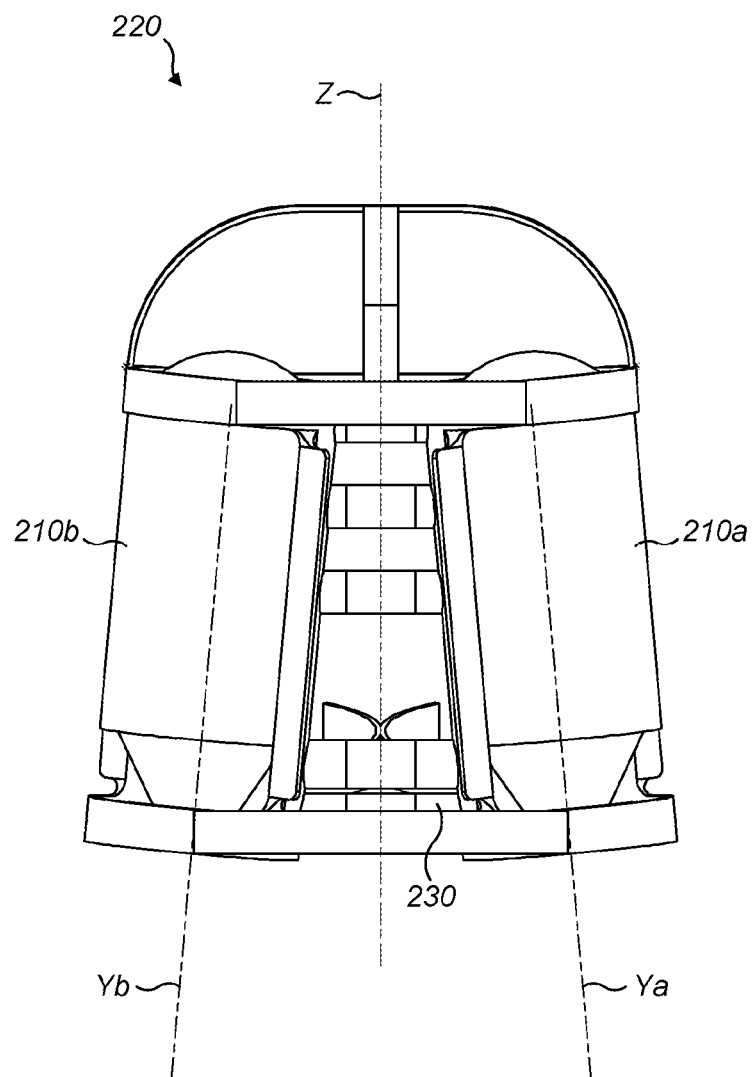
FIGS. 2a to 2c show a second propulsion assembly for use in an embodiment of the disclosure.
Figure 2B:
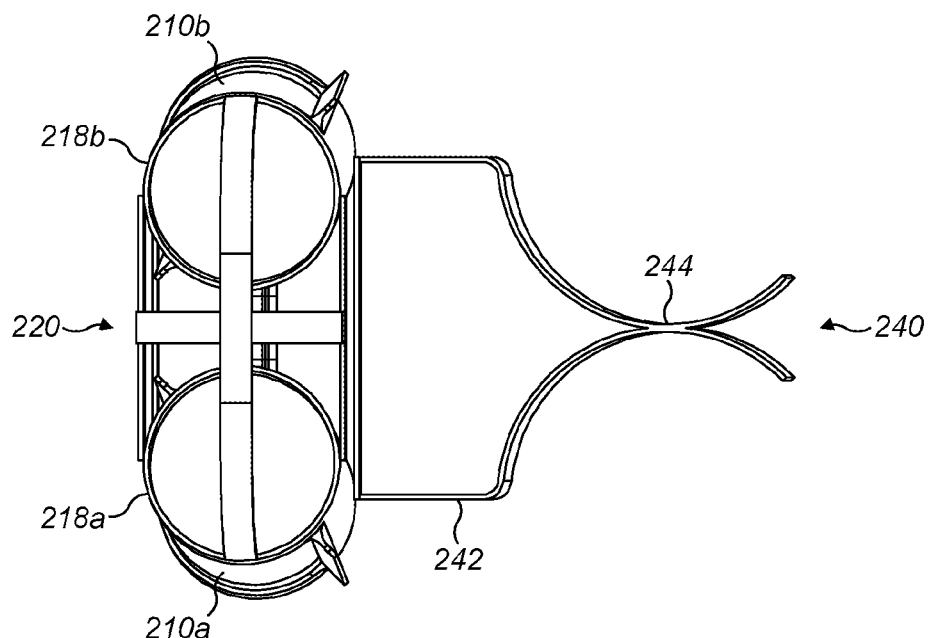
Figure 2C:
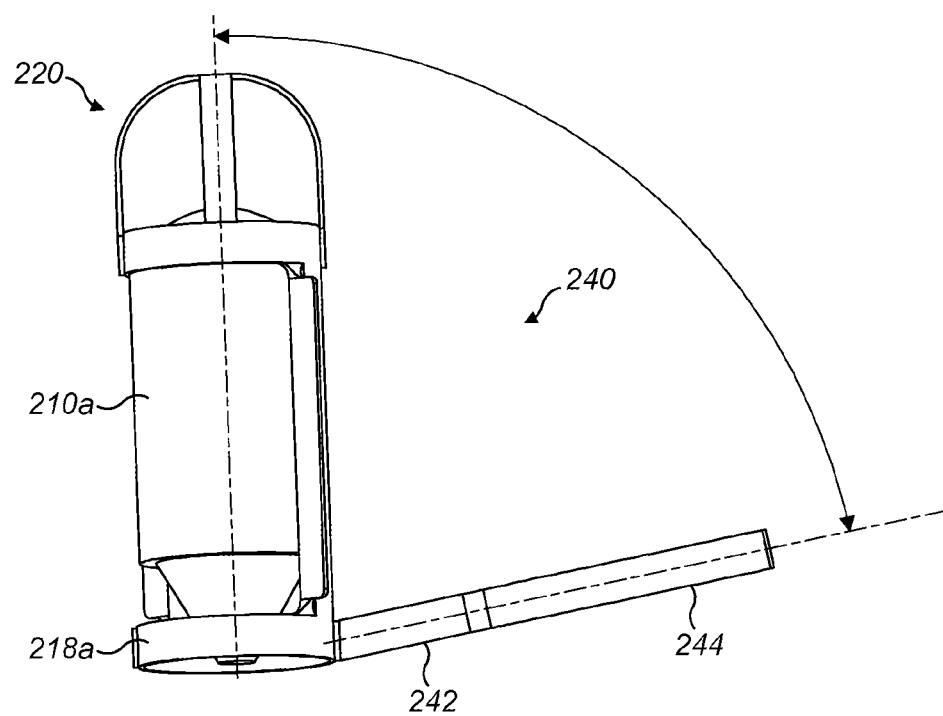
Figure 3E:
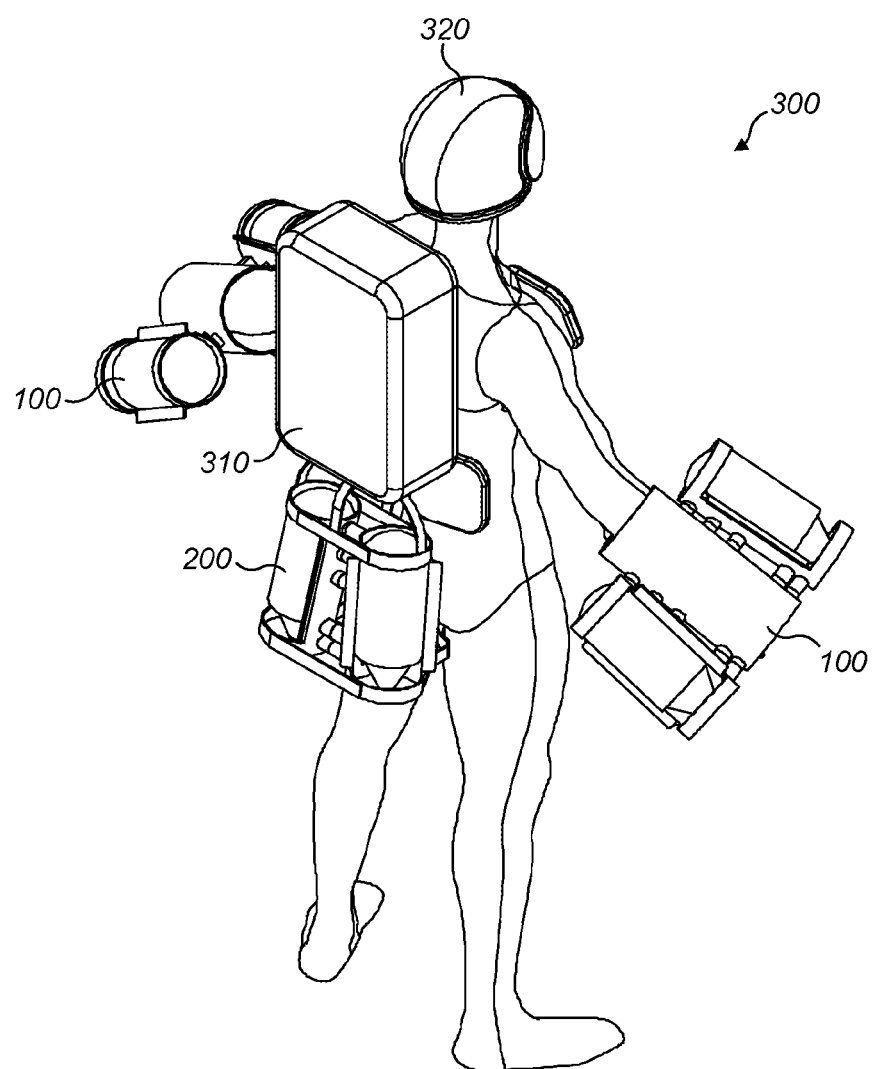
Figure 4A:
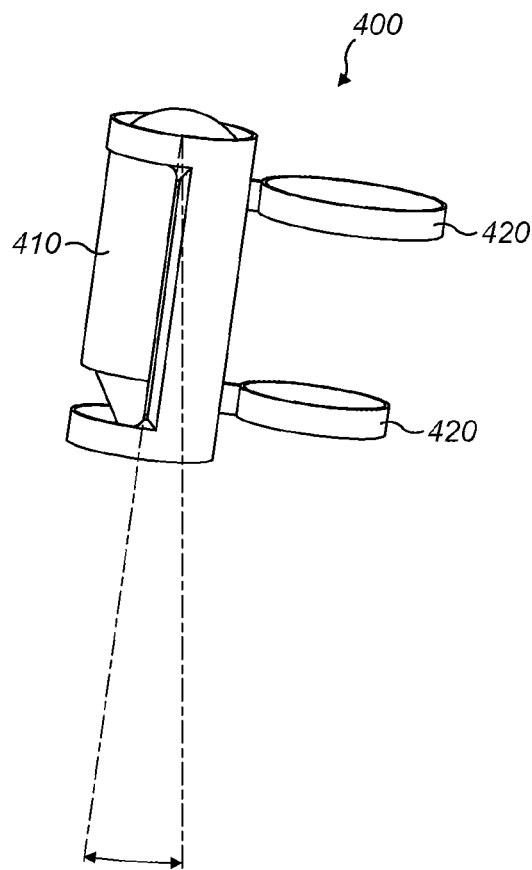
FIGS. 4a to 4c show a third propulsion assembly for use in an embodiment of the disclosure.
Figure 4B:
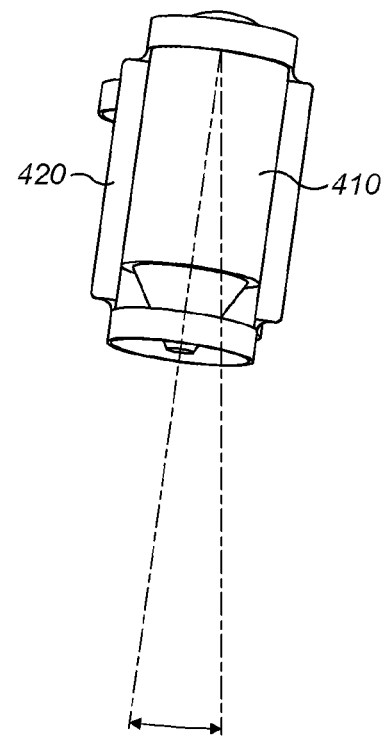
Figure 4C:
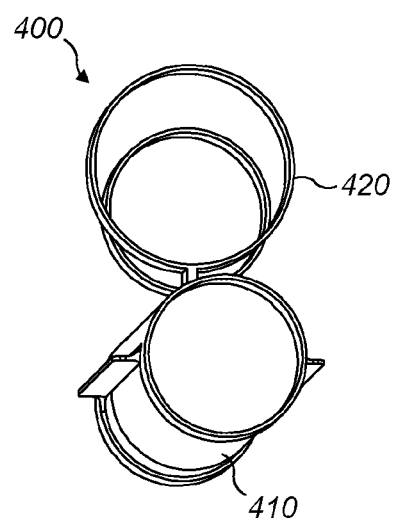
Figure 5B:
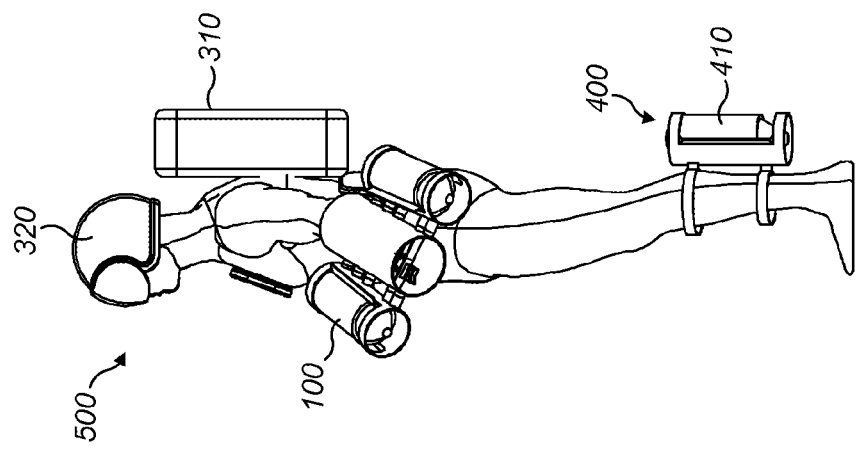
FIGS. 5a to 5d show a second embodiment of a flight system in accordance with the disclosure.
Figure 5A:
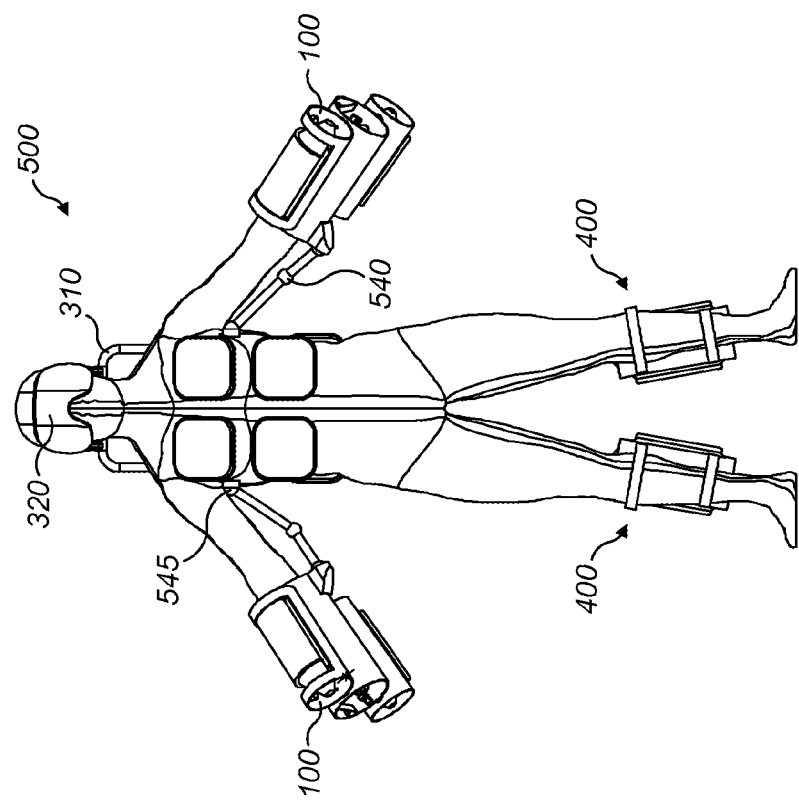
Figure 5D:
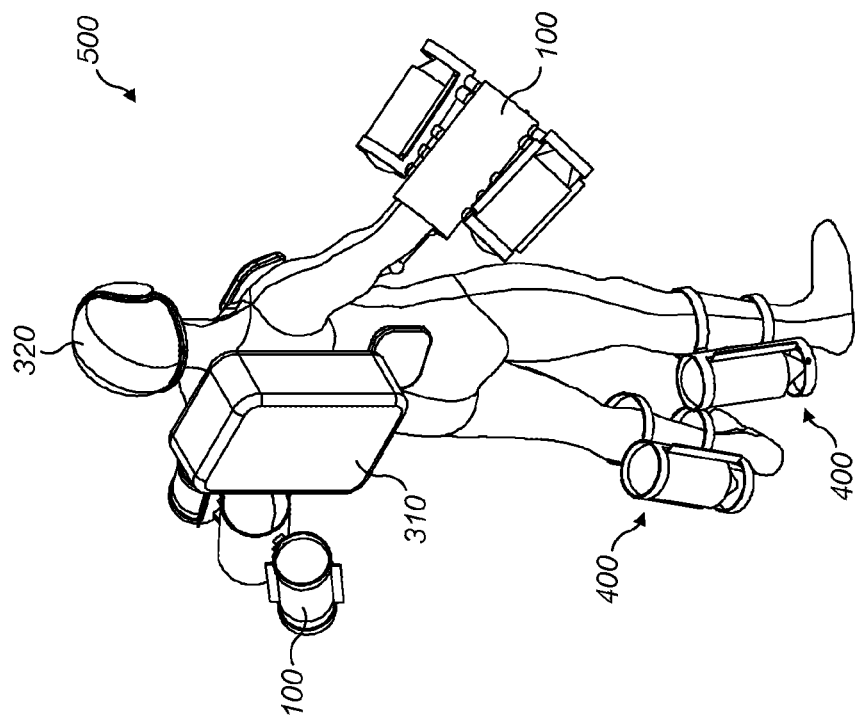
Figure 5C:
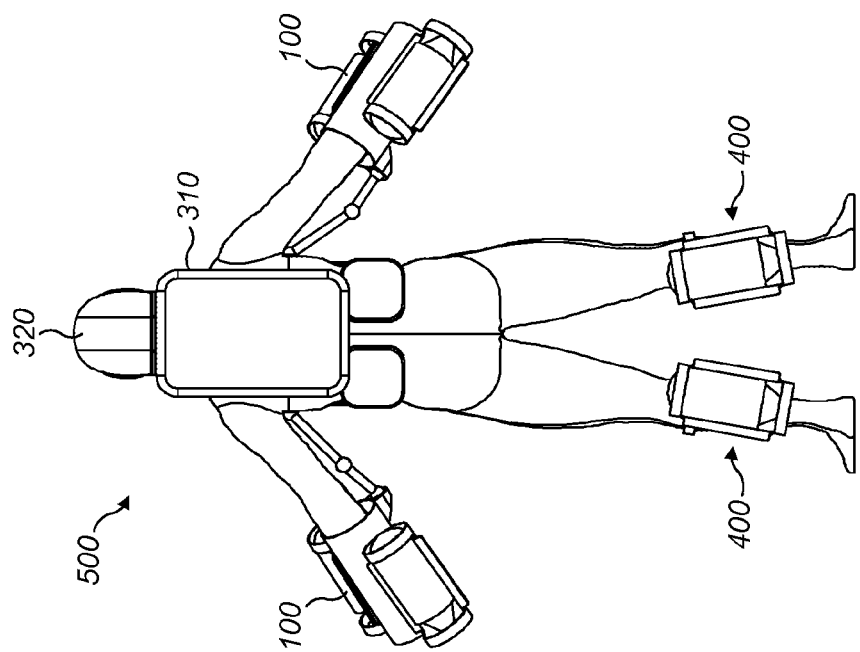
Figure 6C:
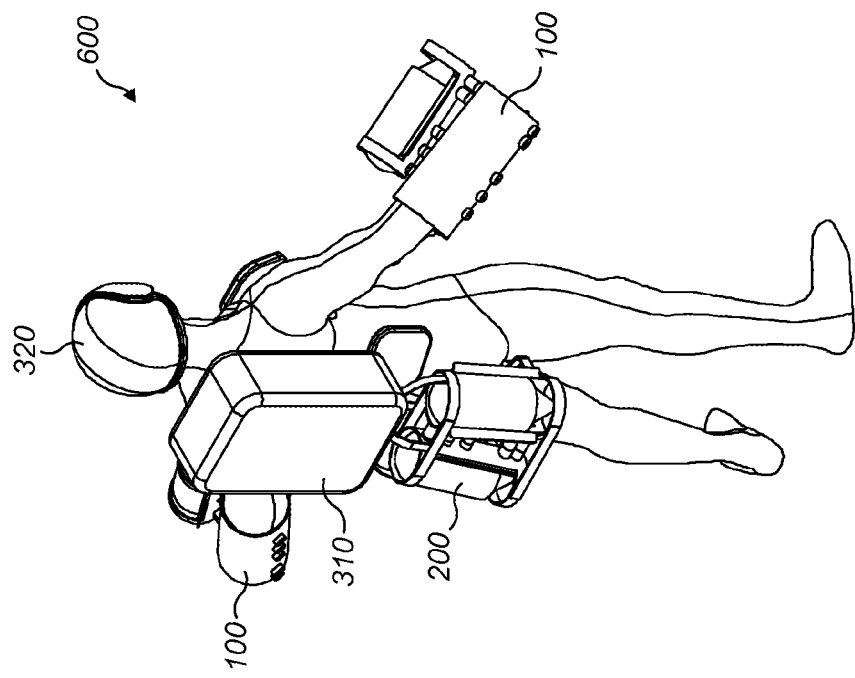
Figure 6D:
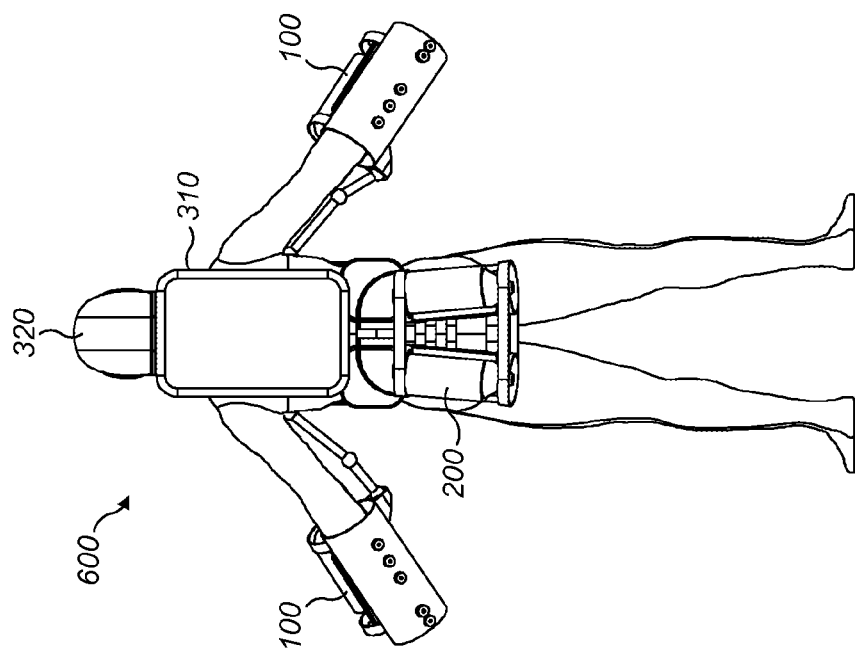

A first embodiment of a propulsion assembly 200 for a user's torso is shown in FIGS. 2a to 2c. In some embodiments a flight system in accordance with the disclosure will have one such propulsion assembly 200.

Body propulsion assembly 200 is configured to apply thrust directly to a user's torso and includes at least one body propulsion device 210 and a support 220.

The support 220 is arranged to support a user's waist or torso. For example, it may include a seat, harness, belt, jacket, and/or other item of clothing for securing the at least one body propulsion device 210 to a user's body. The at least one body propulsion device 210 is supported on the dorsal side of the user's body The support may be configured to be worn on a user's back or waist, but in either case it is advantageous that the support is sized and shaped such that the location at which thrust is generated by the at least one body propulsion device(s) 210 (i.e. the nozzle of the body propulsion device (s) 210 when these are turbines and/or the fan of a fan driven by a motor) is located between the lower edge of the rib cage and knees, and in some embodiments between the upper extent of the lumbar vertebrae and the user's upper thigh.

The support may be sized and shaped such that the location at which thrust is generated by the at least one body propulsion device(s) 210 (i.e. the nozzle of the body propulsion device(s) 210 when these are turbines and/or the fan of a fan driven by a motor) is aligned with the lumbar vertebrae.

The support 220 is arranged to hold the at least one body propulsion device 210 at a fixed angle relative to the user's torso when the body propulsion assembly 200 is worn by (i.e. engages) the user. The support 220 defines an axis Z, which is parallel with a line extending between the center of the user's head and the center of the user's waist when the support is worn.

The support 220 holds the at least one body propulsion device 210 at an angle to the axis Z. That angle has an elevation component, the body propulsion elevation angle W. That is, the body propulsion elevation angle W is the angle in the sagittal plane (the plane that divides the user into left and right sides) between the net thrust produced by the body propulsion assembly 200 and the axis Z.

In other words, the support 220 is configured to hold a user's body relative to the at least one body propulsion device 210 such that a line extending between the center of the user's head and the center of the user's waist extends relative to the orientation of the net thrust provided by the body propulsion assembly 200 by the body propulsion elevation angle W.

The body propulsion elevation angle W is greater than zero. The body propulsion elevation angle W is at least 10° and in some embodiments at least 12°. In some embodiments, the body propulsion elevation angle W is no more than 30° degrees and in some embodiments no more than 18°.

This choice of angle has been found to improve stability and protect the user's legs without greatly reducing total lift.

As can be best seen in FIGS. 2b and 2c, one optionally way of maintaining the body propulsion elevation angle W relative to the user's legs is by providing the support with leg braces 240 for engaging the user's upper thighs. A leg brace 240 may include a section 244 arranged to extend between the user's legs so that the legs may grip the leg brace 240. The leg brace 240 may also have a wider section 242 on which a user may sit.

Although a single body propulsion device is sufficient, the body propulsion assembly 200 may include at least a first body propulsion device 210a and a second body propulsion device 210b. The first body propulsion device 210a is arranged to provide net force along a first axis Ya defining a first propulsion vector. The second body propulsion device 210b is arranged to provide net force along a second axis Yb defining a second propulsion vector. The first propulsion vector is not parallel with the second propulsion vector. The first and second propulsion vectors are directed apart by an angle of at least 5° and in some embodiments at least 20°.

In some embodiments, the first and second body propulsion vectors are directed apart by an angle of no more than 30°.

A first embodiment of a flight system is shown in FIGS. 3a to 3e, in which it can be seen that the system includes a left-hand propulsion assembly 100 (of the type discussed above with reference to FIGS. 1a to 1c); a right-hand propulsion assembly 100 (of the type discussed above with reference to FIGS. 1a to 1c); a body propulsion assembly 200 (of the type discussed above with reference to FIGS. 2a to 2c).

Each propulsion assembly 100, 200 is able to provide a maximum thrust in the range 400N to 500N.

FIGS. 3a to 3e show an embodiment in which two propulsion devices 110 are provided for each of the left-hand and right-hand propulsion assemblies 100. Also in some embodiments is the provision of two propulsion devices 210 for the body propulsion assembly 200. That is, a combination of six propulsion devices 110, 210, with two for each arm and two for the user's torso. Also shown is the above-described rearward orientation of the propulsion devices 210 of the body propulsion assembly 200 when the user assumes an upright standing posture.

As discussed above, the support 220 of the body propulsion assembly 200 is sized and shaped to hold the body propulsion devices 210 so that thrust is produced at a height between the lower edge of the rib cage and knees, and may be level with the lumbar vertebrae.

The flight system 300 also includes an energy storage device 310 for providing power to the propulsion assemblies. This may include a fuel storage vessel for supplying fuel to turbines and/or batteries for powering fans and/or control circuitry. The energy storage device 310 may be provided in the form of a back-pack to be worn above a lower-back-mounted or waist-mounted body propulsion assembly 200, or which may have one or more propulsion devices attached thereto (for example, one either side of a central fuel storage vessel).

Since the flight system 300 may be provided without a wing (i.e. it may be solely dependent upon the propulsion assemblies to provide lift), it is beneficial to minimize interruptions in the thrust provided by any one propulsion device 110, 210, 410. One source of interruptions, in the case in which the propulsion assemblies include turbines, is the possibility of a bubble in the fuel line. This can potentially cause a momentary loss of thrust or even shut down the engine. It is advantageous that when the energy storage device 310 includes a fuel storage vessel, the vessel is provided as a variable volume storage (for example, a bladder or a cylinder closed by a piston) rather than a fixed volume chamber. In this way, no air will be present in the fuel storage vessel. 25. Embodiments include a bubble sensor for sensing the presence of bubbles in fuel supply lines for supplying fuel to turbines. The bubble sensor is for alerting the user to the presence of bubbles. In some embodiments, the bubble sensor may provide a bubble signal representative of an amount of bubbles (volume or number, etc.) in the fuel line. When the bubble signal exceeds a threshold, the user is alerted and may land, e.g. before the turbines fail. The alert may be audible or visual (for example using the head-up display described below).

A control system 330 is provided. This may be embodied in a single device to be worn on the user's chest, or may be formed with distributed devices. The control system 330 is arranged to provide control signals to each propulsion assembly 100, 200. The control system 330 may also be arranged to receive control signals from each propulsion assembly 100, 200 and/or from the energy storage device 310.

Whilst the control system 330 may independently control the left-hand and right-hand propulsion assemblies 100, they may each provide the same thrust.

Thus, in various embodiments the control signals may include: a first throttle signal generated by controls 126 of one of the left-hand and right-hand propulsion assemblies 100, and a second throttle signal generated by controls 126 of the other of the left-hand and right-hand propulsion assemblies 100. The control system 330 uses the first throttle signal to command the left-hand and right-hand propulsion assemblies 100 to each provide a corresponding first thrust. The control system 330 uses the second throttle signal to command the body propulsion assembly 200 to provide a second corresponding thrust.

As discussed above, the controls 126 may be embodied as one or two input devices the left-hand and right-hand propulsion assemblies 100. In each case, one of the input devices provides a variable signal in the form of the throttle signal. The other of the input devices (if provided) may be a "kill switch", which provides a binary output and is monitored by the control system 330 so as to deactivate one or more or all of the propulsion assemblies 100 of the flight system when released.

The flight system may include a helmet 320 which includes a head-up display in communication with the control system 330. The head-up display represents the amount of energy remaining in the energy storage device 310 (e.g., a volume of fuel remaining in the bladder) and/or the thrust of each of the propulsion assemblies 100, 200 (for example, the rotational speeds of the turbines).

Whereas, the flight system 300 of the first embodiment has been shown with a left-hand propulsion assembly 100, a right-hand propulsion assembly 100, and a body propulsion assembly 200, embodiments are envisaged in which the body propulsion assembly 200 is replaced by (as in the flight system 500 of FIGS. 5a to 5d), or supplemented with, a leg propulsion assembly 400 (either one for both legs, or one for each leg).

A leg propulsion assembly 400 includes: at least one leg propulsion device 410; and a support 420. The support 420 may be sized and shaped to be worn on a user's calf such that the at least one leg propulsion assembly 410 is on the dorsal side of the calf. The support 420 may include bindings for surrounding the user's leg such that the bindings define a longitudinal axis aligned with the bones of the lower leg.

Some embodiments may have a single leg propulsion device 410. The support 420 may be sized and shaped to be worn on a user's calf such that the leg propulsion device 410 is at an angle V to the longitudinal axis of the support 420 (i.e. is not aligned with the bones of the lower leg). Angle V is such that when worn, there is a small force applied inwardly to press the user's legs towards one another. This provides divergence of thrust when a pair of leg propulsion assemblies 400 are worn and has been found to improve stability. The support 420 may be arranged such that the leg propulsion device 410 is at an angle to the longitudinal axis of the support 420 of at least 3°. In some embodiments, the support 420 may be arranged such that the leg propulsion device 410 is at an angle to the longitudinal axis of the support 420 of no more than 20°. In this way, the leg propulsion devices 410 at that angle to the user's leg when worn.

In the embodiments discussed above the left-hand and right-hand propulsion assemblies 100 each included two propulsion devices 110. In some embodiments, more may be provided, and in fact only one is required. Thus, there is envisaged an embodiment of a flight system 600 such as that shown in FIGS. 6a to 6d, in which each of the left-hand and right-hand propulsion assemblies 100 each included a single propulsion device 110.

As can be seen from the Figures, in each embodiment of a flight system 300, 500, 600, the left-hand and right-hand propulsion assemblies are each connected to the body propulsion assembly via an articulated frame 340, 540, 640. This is merely optional, and in practice, a suitably trained individual can use the systems without such a frame.

However, a frame 340, 540, 640 is useful for less trained individuals to restrict the relative movement of the left-hand and right-hand propulsion assemblies 100. By providing a set of joints to articulate the frame 340, 540, 640, predetermined degrees of freedom may be provided. This can ensure that the left-hand and right-hand propulsion assemblies 100 will always be oriented in an appropriate direction (for example, the frame 340, 540, 640 can prevent an arm behind positioned behind the user's back).

The frame 340, 540, 640 would include composite materials and/or titanium. It may have a hinge under each armpit for allowing adduction or abduction of the arms, a rotational joint between the shoulder and elbow for allowing circumduction of the upper arm, a hinge on the elbow for allowing the arm to bend, another rotational joint between the elbow and wrist for allowing circumduction of the hand. Merely restricting the motion of the user in this way will help to support the load.

However, it may be advantageous to use a control system having one or more gyros and/or accelerometers for controlling the frame 340, 540, 640 and the thrust applied by the propulsion assemblies 100, 200, 400. In which case, actuators 345, 545, 645 may be provided for actuating the articulated frame. The actuators 345, 545, 645, may be servos as drawn, or linear actuators (such as pneumatic or hydraulic actuators).

The actuators 345, 545, 645 may be controlled by the control system 330 to provide a force towards a position of stability (where horizontal components of the thrust are balanced) based upon signals from one or more gyros and/or accelerometers forming part of the system. As an example, this may be carried out using a PID controller to control the angles of the net thrust vectors produced by each propulsion assembly 100, 200, 400 so as to provide a predetermined net horizontal thrust (for example zero or a small positive thrust).

Each propulsion device 110, 210, 410 produces thrust in a predetermined direction. As is known in the art, this may be achieved by accelerating air and/or combustion products in a longitudinal direction of the propulsion device 110, 210, 410.

For example, each propulsion device 110, 210, 410 may be a gas turbine. For example, a suitable turbine would be a JetCat turbine available from JetCat Germany, which is typically used in model aircraft or military drones.

Alternatively, a ducted fan driven by an electric motor may be used as a propulsion device 110, 210, 410. If it is required that the system may fly for an extended period, it is possible that the power supply could be connected via a long cable and so need not be carried, thereby reducing the load for the fans.

Whilst the divergent propulsion devices of each propulsion assembly may be individual turbines (or ducted fans), it is envisaged that the divergent thrusts may be achieved using a single turbine having two or more exhaust nozzles that themselves diverge by the stabilizing angles.

Furthermore, whilst wings are not needed for the flight system to fly, these may additionally be provided. For example, a suit forming part of the flight system may include a membrane extending between the arms and the side of the body, or a membrane extending between the legs. Alternatively (or additionally) a rigid wing shaped to provide lift may be worn on the user's back.

The invention claimed is:

1. A wearable flight system, comprising:
a plurality of propulsion assemblies, including:
a left-hand propulsion assembly configured to be worn on a user's left hand and/or forearm;
a right-hand propulsion assembly configured to be worn on the user's right hand and/or forearm,
wherein the left-hand propulsion assembly and the right-hand propulsion assembly further comprise a ducted fan or a turbine, and
a body propulsion assembly comprising a support structure configured to support a user's waist or torso, the body propulsion assembly including a device configured to provide a net thrust along an axis, wherein the support structure of the body propulsion assembly is configured to hold the user's body such that a line extending between the center of the user's head and the center of the user's waist extends, relative to an orientation of the axis of net force provided by the thrust of the body propulsion assembly during use, by a body propulsion elevation angle, the body propulsion elevation angle being greater than zero and less than 30°.

2. The system of claim 1, wherein each of the left-hand and right-hand propulsion assemblies are configured to be worn such that during use, a net thrust is directed substantially in line with the user's respective forearm and away from the elbow.

3. The system of claim 1, wherein the body propulsion elevation angle is at least 10°.

4. The system of claim 1, wherein the support structure is configured to be worn on the user's back or waist and the support structure is connected to the body propulsion assembly such that the body propulsion assembly is located below the user's waist.

5. The system of claim 1, wherein the left-hand and right-hand propulsion assemblies collectively are configured to provide maximum thrust in excess of a maximum thrust of the body propulsion assembly.

6. The system of claim 1, further comprising first and second throttle controls, wherein the first throttle control is configured to control a thrust provided by both the left-hand and right-hand propulsion assemblies, and the second throttle control is configured to control a thrust provided by the body propulsion assembly.

7. The system of claim 1, wherein the left-hand and right-hand propulsion assemblies each include a device configured to provide a first thrust along an axis defining a first hand propulsion vector and a second thrust along an axis defining a second hand propulsion vector.

8. The system of claim 1, wherein the left-hand and right-hand propulsion assemblies each further comprise at least first and second respective hand propulsion devices, the first hand propulsion device configured to provide a net force along an axis defining a first hand propulsion vector, the second hand propulsion device configured to provide a net force along an axis defining a second hand propulsion vector.

9. The system of claim 7, wherein the first hand propulsion vector is not parallel to the second hand propulsion vector.

10. The system of claim 1, wherein the left-hand and right-hand propulsion assemblies further comprise turbines and/or ducted electric fans.

11. The system of claim 1, wherein the body propulsion assembly further comprises a turbine.

12. The system of claim 1, further comprising an inflatable bladder configured to store fuel in communication with at least one of the right-hand and left-hand propulsion assemblies via a fuel supply line.

13. The system of claim 12, further comprising a bubble sensor configured to sense a presence of bubbles in the fuel supply line to thereby alert a user to the presence of bubbles.

14. The system of claim 1, wherein the left-hand and right-hand propulsion assemblies are each connected to the body propulsion assembly via an articulated frame whereby the left-hand and right-hand propulsion assemblies are movable relative to the body propulsion assembly with predetermined degrees of freedom.

15. The system of claim 1, wherein the left-hand and right-hand propulsion assemblies are each connected to a controller that is configured to control a thrust generated by each propulsion assembly, wherein the controller varies the thrust depending on the amount of fuel stored in a fuel store.

* * * * *